United States Patent
Nemoto et al.

(10) Patent No.: US 9,587,072 B2
(45) Date of Patent: Mar. 7, 2017

(54) METHOD FOR PRODUCING POLYMER

(71) Applicants: Taichi Nemoto, Shizuoka (JP); Chiaki Tanaka, Shizuoka (JP); Yoko Arai, Shizuoka (JP); Satoshi Izumi, Shizuoka (JP); Yasuo Kamada, Shizuoka (JP)

(72) Inventors: Taichi Nemoto, Shizuoka (JP); Chiaki Tanaka, Shizuoka (JP); Yoko Arai, Shizuoka (JP); Satoshi Izumi, Shizuoka (JP); Yasuo Kamada, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/889,343

(22) PCT Filed: May 23, 2014

(86) PCT No.: PCT/JP2014/064353
§ 371 (c)(1),
(2) Date: Nov. 5, 2015

(87) PCT Pub. No.: WO2014/189151
PCT Pub. Date: Nov. 27, 2014

(65) Prior Publication Data
US 2016/0194445 A1    Jul. 7, 2016

(30) Foreign Application Priority Data
May 23, 2013 (JP) ................. 2013-108508

(51) Int. Cl.
C08L 77/02    (2006.01)
C08G 69/18    (2006.01)
C08G 61/06    (2006.01)
C08G 69/20    (2006.01)
C08G 69/24    (2006.01)
C08G 81/02    (2006.01)

(52) U.S. Cl.
CPC ............ *C08G 69/18* (2013.01); *C08G 61/06* (2013.01); *C08G 69/20* (2013.01); *C08G 69/24* (2013.01); *C08L 77/02* (2013.01); *C08G 81/028* (2013.01); *C08J 2203/08* (2013.01); Y02P 20/544 (2015.11)

(58) Field of Classification Search
CPC ..... C08G 61/06; C08G 81/028; Y02P 20/544; C08L 77/02; C08J 2203/08
See application file for complete search history.

(56) References Cited

U.S. PATENT DOCUMENTS

| | | | |
|---|---|---|---|
| 5,245,004 A * | 9/1993 | Kyuda .................. | C08G 69/20 528/312 |
| 5,399,662 A | 3/1995 | Memeger, Jr. | |
| 6,025,459 A * | 2/2000 | DeSimone ............... | B01J 3/008 528/310 |
| 2004/0072985 A1 | 4/2004 | Lee et al. | |
| 2011/0218301 A1 | 9/2011 | Nemoto et al. | |
| 2014/0163194 A1 | 6/2014 | Nemoto et al. | |

FOREIGN PATENT DOCUMENTS

| | | |
|---|---|---|
| EP | 0 522 533 A1 | 1/1993 |
| EP | 2 365 016 A1 | 9/2011 |
| JP | 45-029832 | 9/1970 |
| JP | 01-019307 | 4/1989 |
| JP | 01-141914 | 6/1989 |
| JP | 02-024331 | 1/1990 |
| JP | 05-017573 | 1/1993 |
| JP | 05-170895 | 7/1993 |
| JP | 07-316288 | 12/1995 |
| JP | 08-157594 | 6/1996 |
| JP | 09-506655 | 6/1997 |
| JP | 2004-277698 | 10/2004 |
| JP | 2011-208115 | 10/2011 |
| JP | 2013-057050 | 3/2013 |
| WO | WO 2013/018874 A1 | 2/2013 |

OTHER PUBLICATIONS

International Search Report Issued Sep. 2, 2014 for counterpart International Patent Application No. PCT/JP2014/064353 filed May 23, 2014.

Extended European Search Report issued Jun. 1, 2016 in Patent Application No. 14801772.6.

* cited by examiner

*Primary Examiner* — Gregory Listvoyb
(74) *Attorney, Agent, or Firm* — Oblon, McClelland, Maier & Neustadt, L.L.P.

(57) ABSTRACT

To provide a method for producing a polymer, which contains: bringing a ring-opening polymerizable monomer containing an amide bond, and a compressive fluid into contact with each other to melt or dissolve the ring-opening polymerizable monomer containing an amide bond, followed by allowing the ring-opening polymerizable monomer containing an amide bond to react through ring-opening polymerization in the presence of a basic organic metal catalyst and a cocatalyst, to thereby obtain a polymer product.

11 Claims, 3 Drawing Sheets

METHOD FOR PRODUCING POLYMER

TECHNICAL FIELD

The present invention relates to a method for producing a polymer through ring-opening polymerization of a ring-opening polymerizable monomer containing an amide bond.

BACKGROUND ART

Polyamide has excellent toughness owing to a hydrogen bond of an amide group, and is used for mechanical parts, building materials, films, or fibers. When polyamide is produced, a method for polymerizing a ring-opening polymerizable monomer containing an amide bond is used. In the case where Nylon 6 is produced as one example of the polyamide, for example, known is a method where ε-caprolactam, which is a ring-opening polymerizable monomer containing an amide bond, is polymerized through melt polymerization in the presence of a water-catalyst.

In the case of melt polymerization using a water-catalyst, however, a reaction speed is slow, and it may take a few hours to complete a polymerization reaction. In accordance with this method, moreover, it is necessary to carry out the reaction at temperature equal to or higher than a melting point of a resulting polymer, and about 10% of the ring-opening polymerizable monomer and oligomer is remained in the polymer product due to an equilibrium reaction. Therefore, there is a case where a step for removing the ring-opening polymerizable monomer or oligomer from the polymer product for industrial use.

Moreover, also known is a method where ε-caprolactam is polymerized through ring-opening polymerization by combining melt polymerization and solid phase polymerization (see PTL 1). In the case where this method is used, however, a polymerization reaction takes a few hours, and a residual amount of the ring-opening polymerizable monomer and oligomer in the polymer product is large.

In order to shorten a reaction time and reduce a residual amount of a ring-opening polymerizable monomer and oligomer in production of polyamide, an anionic polymerization method has been used. In the case where this method is used, polyamide is produced by polymerizing a ring-opening polymerizable monomer containing an amide bond using an alkali metal (e.g., sodium, and potassium) or a Grignard reagent as a main catalyst. In accordance with this method, a polymer having a high molecular weight can be obtained with a short reaction time due to high reactivity. In accordance with this method, moreover, a reaction can be carried out at low temperature compared to a melt polymerization method, and therefore an amount of the ring-opening polymerizable monomer and oligomer remained in the polyamide product can be reduced.

Disclosed as an example of an anionic polymerization method is a method where ε-caprolactam is polymerized using a phosphazene basic compound and N-acetyl-ε-caprolactam as catalysts (see PTL 2). Moreover, disclosed is to attain a polymer having the weight average molecular weight of 780,000 polymerization of anhydrous ε-caprolactam performed for 20 minutes in the presence of ethylmagnesium bromide as a Grignard compound, and adipoyl biscaprolactam as an acyl lactam compound (see PTL 3).

In the case where an anionic polymerization method is used in production of polyamide, a generated product is solidified in the second half of the reaction, as the reaction temperature is set to the temperature equal to or lower than the melting point of the polymer product (for example, 150° C. or lower in case of Nylon 6). For example, it is disclosed that fluidity of a system is lost and a polymer product is solidified 18 minutes later from an initiation of polymerization, when the polymerization is initiated at 150° C. by adding N-acetylcaprolactam and ethylmagnesium bromide to ε-caprolactam (see PTL 4).

CITATION LIST

Patent Literature

PTL 1: Japanese Application Laid-Open (JP-A) No. 05-170895
PTL 2: JP-A No. 09-506655
PTL 3: Japanese Patent Publication Application (JP-B) No. 01-19807
PTL 4: JP-A No. 07-316288

SUMMARY OF INVENTION

Technical Problem

In the case where a ring-opening polymerizable monomer containing an amide bond is polymerized through ring-opening polymerization in accordance with a conventional anionic polymerization, a polymer product is solidified as the reaction progresses. Therefore, there are problems that a shape of the polymer product, and a degree of freedom when the polymer product is taken out from a reaction vessel are limited.

Accordingly, the present invention aims to solve the aforementioned various problems in the art and to achieve the following object.

The object of the present invention is to provide a method for producing a polymer, which produces a polymer through ring-opening polymerization of a ring-opening polymerizable monomer containing an amide bond, and can improve a shape of a polymer product, or a degree of freedom when the polymer product is taken out from a reaction vessel.

Solution to Problem

The means for solving the aforementioned problems is as follows:

The method for producing a polymer, which is according to the present invention, contains:

bringing a ring-opening polymerizable monomer containing an amide bond, and a compressive fluid into contact with each other to melt or dissolve the ring-opening polymerizable monomer containing an amide bond, followed by allowing the ring-opening polymerizable monomer containing an amide bond to react through ring-opening polymerization in the presence of a basic organic metal catalyst and a cocatalyst, to thereby obtain a polymer product.

Advantageous Effects of Invention

The present invention can improve a shape of a polymer product and a degree of freedom when the polymer product is taken out from a reaction vessel in the production of a polymer where a ring-opening polymerizable monomer containing an amide bond is polymerized through ring-opening polymerization.

DESCRIPTION OF EMBODIMENTS

Method for Producing Polymer

Figure 1:
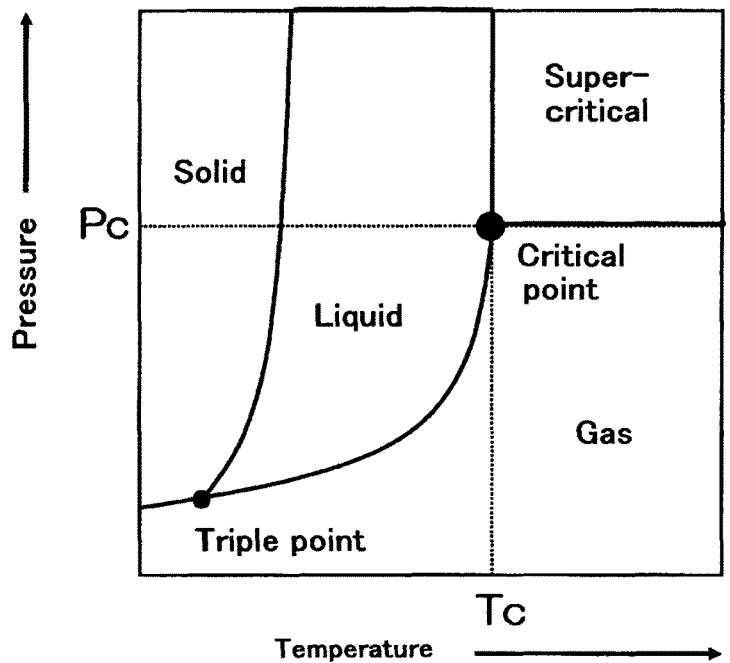
FIG. 1 is a general phase diagram depicting a state of a substance depending on temperature and pressure.

An embodiment of the present invention is specifically explained hereinafter. The method for producing a polymer according to the present embodiment contains: bringing raw materials including a ring-opening polymerizable monomer containing an amide bond, and a compressive fluid into contact with each other to melt or dissolve the ring-opening polymerizable monomer containing an amide bond, followed by allowing the ring-opening polymerizable monomer containing an amide bond to react through ring-opening polymerization in the presence of a basic organic metal catalyst and a cocatalyst, to thereby obtain a polymer product.

In the present embodiment, the raw materials are materials that are a base for producing a polymer, will be constitutional components of the polymer, and contains a monomer, and may further contain appropriately selected optional components, such as an initiator, and additives, according to the necessity.

The present inventors have diligently conducted researches. Based on the researches, they have found that, for example, by adding a compressive fluid, which does not function as Lewis acid to a catalyst or initiator for use, to a polymer product (polyamide) composed of a ring-opening polymerizable monomer containing an amide bond, a viscosity of the mixture thereof is reduced. As a result, the ring-opening polymerizable monomer or the polyamide becomes in the melted state at the reaction temperature equal to or lower than the melting point of the polyamide, the reaction is uniformly progressed at the reaction temperature equal to or lower than the melting point, and removal of the polyamide after the reaction becomes also easy. Note that, the method for producing a polymer of the present embodiment is suitably used for production of a polymer a viscosity of which is reduced by a compressive fluid. Moreover, the aforementioned monomer is preferably melted or dissolved when the monomer is brought into contact with a compressive fluid. In accordance with the production method of the present embodiment, furthermore, an amount of monomers and oligomers remained in the polymer product can be reduced to a level at which any removal process is not required, because the reaction temperature is low, and a depolymerization reaction is suppressed.

<Raw Materials>

First, the raw materials for use in the aforementioned production method, such as a ring-opening polymerizable monomer containing an amide bond, and optional additives, are explained.

<<Ring-Opening Polymerizable Monomer>>

In the present embodiment, the ring-opening polymerizable monomer means a cyclic monomer for use in ring-opening polymerization. The ring-opening polymerizable monomer containing an amide bond for use in the present embodiment is not particularly limited, and examples thereof include a cyclic amide compound. The cyclic amide compound is not particularly limited, and examples thereof include ε-caprolactam, α-pyrrolidone, α-piperidone, enantholactam, capryllactam, and laurolactam.

<<Additives>>

Additives may be optionally added for ring-opening polymerization. Examples of the additives include a surfactant, an antioxidant, a stabilizer, an anticlouding agent, an UV-ray absorber, a pigment, a colorant, inorganic particles, various fillers, a heat stabilizer, a flame retardant, crystal nucleating additives, an antistatic agent, a surface wetting agent, combustion adjuvant, a lubricant, a natural product, a releasing agent, a plasticizer, and other similar agents. Optionally, a polymerization terminator (e.g., benzoic acid, hydrochloric acid, phosphoric acid, metaphosphoric acid, acetic acid, and lactic acid) may be used after the polymerization reaction. A blended amount of the additives is varied depending on the purpose for adding the additives, or a type of the additives, but the amount thereof is preferably 0 parts by mass to 5 parts by mass, relative to 100 parts by mass of the polymer.

As for the stabilizer, epoxidized soybean-oil, or carbodiimide is used. As for the antioxidant, 2,6-di-t-butyl-4-methylphenol, or butylhydroxyanisole is used. As for the anticlouding agent, glycerin fatty acid ester, or monostearyl citrate is used. As for the fillers, clay, talc, or silica each having a function as an UV-ray absorber, a heat stabilizer, a flame retardant, an internal releasing agent, or crystal nucleating additives is used. As for the pigment, titanium oxide, carbon black, or ultramarine blue is used.

<Catalyst>

Examples of the catalyst for use in the ring-opening polymerization reaction in the present embodiment include a basic organic metal catalyst, and/or a cocatalyst. In the case where a plurality of the catalysts is used, an order of adding the catalysts to the ring-opening polymerizable monomer containing an amide bond is arbitrary selected.

Examples of the basic organic metal catalyst include a Grignard compound, alcoholate, and an organic lithium compound.

The Grignard compound is not particularly limited, and examples thereof include ethylmagnesium bromide.

The alcoholate is not particularly limited, and examples thereof include sodium ethoxide, and potassium t-butoxide.

The organic lithium compound is not particularly limited, and examples thereof include n-butyl lithium.

An amount of the basic organic metal catalyst for use is not particularly limited, and for example, the amount thereof is 0.05 mol % to 5 mol %, preferably 0.2 mol % to 1 mol %, relative to the ring-opening polymerizable monomer containing an amide bond. When the amount of the catalyst for use is smaller than 0.05 mol %, a polymerization reaction speed may be slow. When the amount of the catalyst for use is greater than 5 mol %, it may be difficult to obtain polyamide having a high molecular weight.

As for the cocatalyst, an acyl lactam compound, such as N-acetylcaprolactam, adipoyl biscaprolactam, and terephthaloyl biscaprolactam, is suitably used. Note that, the acyl lactam compound include a compound that gives an acyl lactam after reacting with lactam, such as carboxylic acid halide, and carboxylic acid anhydride.

An amount of the cocatalyst for use is not particularly limited, but the amount thereof is preferably 0.01 mol % to 0.2 mol %, more preferably 0.05 mol % to 0.15 mol %, relative to the monomer. When the amount of the cocatalyst is smaller than 0.01 mol %, a polymerization reaction speed may be slow and moreover polyamide having a high molecular weight may not be attained. When the amount of the cocatalyst is greater than 0.2 mol %, it may be difficult to attain polyamide having a high molecular weight.

<Compressive Fluid>

Figure 2:
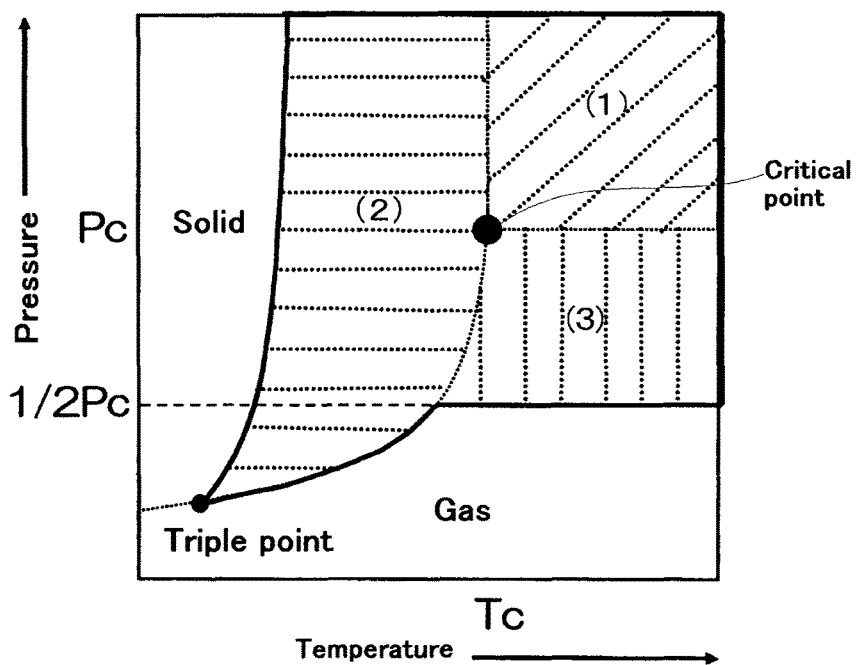
FIG. 2 is a phase diagram for defining a range of a compressive fluid in the present embodiment.

Next, a compressive fluid for use in the production method of the present embodiment s explained with reference to FIGS. 1 and 2. FIG. 1 is a phase diagram depicting the state of a substance depending on pressure and temperature conditions. FIG. 2 is a phase diagram which defines a range of a compressive fluid. In the present embodiment, the term "compressive fluid" refers to a state of a substance present in any one of the regions (1), (2) and (3) of FIG. 2 in the phase diagram of FIG. 1.

In such regions, the substance is known to have extremely high density and show different behaviors from those shown at normal temperature and normal pressure. Note that, a substance is a supercritical fluid when it is in the region (1). The supercritical fluid is a fluid that exists as a noncondensable high-density fluid at temperature and pressure exceeding the corresponding critical points, which are limiting points at which a gas and a liquid can coexist. When a substance is in the region (2), the substance is a liquid, but in the present embodiment, it is a liquefied gas obtained by compressing a substance existing as a gas at normal temperature (25° C.) and ambient pressure (1 atm). When a substance is in the region (3), the substance is in the state of a gas, but in the present invention, it is a high-pressure gas whose pressure is ½ or higher than the critical pressure (Pc), i.e. ½ Pc or higher.

A substance used as the compressive fluid is preferably a substance, which does not deactivate a catalyst, and plasticizes generated polyamide. Such a compressive fluid does not react with an organic metal compound or a Grignard compound, and can reduce a melting point or viscosity of generated polyamide. By adding the compressive fluid to the ring-opening polymerization system, a polymer having a less amount of monomer residues can be continuously attained at the reaction temperature equal to or lower than the melting point without using an organic solvent. The compressive fluid, which can plasticize the generated polyamide without deactivating the catalyst, is not particularly limited, and examples thereof include a compressive fluid containing ether or hydrocarbon, and nitrogen. Examples of the compressive fluid containing ether or hydrocarbon include methane, ethane, propane, 2,3-dimethylbutane, ethylene, and dimethyl ether. Among them, dimethyl ether having a critical point of 127° C., 5.4 MPa, is preferable, as dimethyl ether has an extremely high effect of plasticizing polyamide having a high melting point and tendency to form a hydrogen bond, due to a molecular structure of dimethyl ether, which forms a hydrogen bond, and dimethyl ether does not impair activity of a basic organic catalyst. These compressive fluids may be used alone, or in combination.

Note that, in the case where carbon dioxide is used as a compressive fluid, carbon dioxide acts as Lewis acid to deactivate a catalyst, when an organic metal compound or a Grignard compound is used as a main catalyst, and as a result, a reaction may not be progressed.

<Polymerization Reaction Device>

Figure 3:
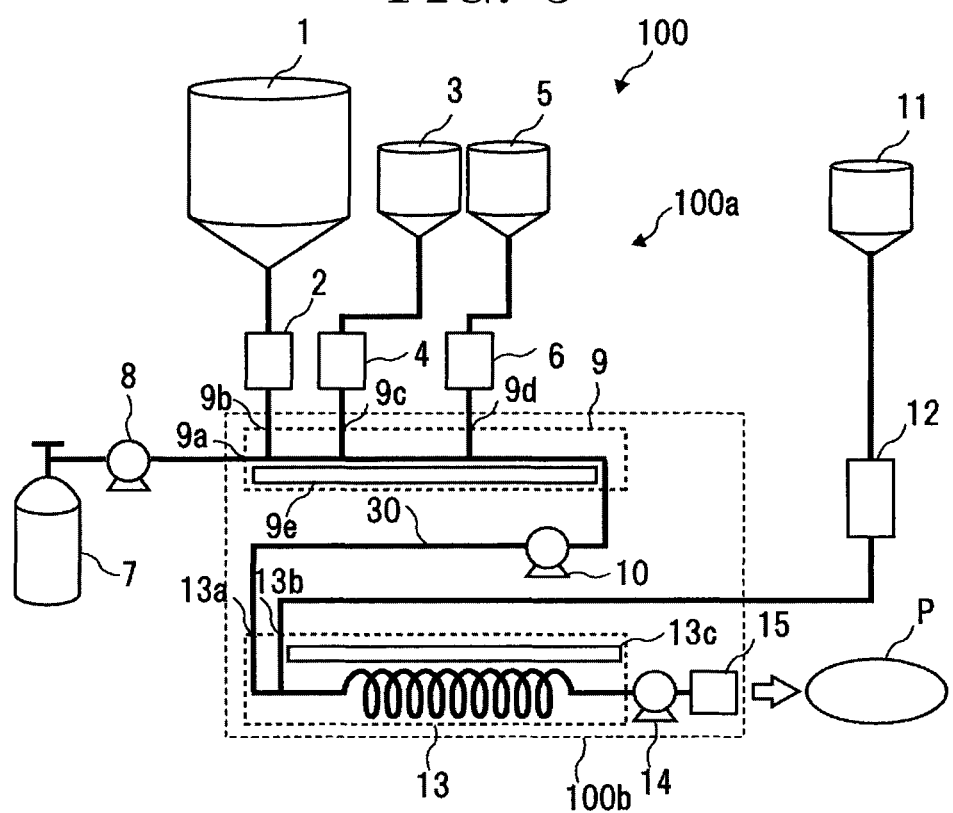
FIG. 3 is a system diagram illustrating one example of a polymerization step.

Subsequently, a polymerization reaction device for use in the production of the polymer in the present embodiment is explained with reference to FIGS. 3 and 4. First, the polymerization reaction device 100 is explained with reference to FIG. 3. FIG. 3 is a system diagram illustrating one example of a polymerization step. In the case where a ring-opening polymerizable monomer containing an amide bond is polymerized through anionic polymerization in accordance with a conventional production method, a polymer cannot be continuously produced, as a polymer product is solidified during the reaction. In accordance with the production method of the present embodiment, a polymer can be continuously produced, for example, by means of the polymerization reaction device 100. The polymerization reaction device 100 contains a supply unit 100a configured to supply raw materials, such as a ring-opening polymerizable monomer, and to supply compressive fluid, and a polymerization reaction device main body 100b, which is one example of a polymer production device configured to polymerize the ring-opening polymerizable monomer supplied by the supply unit 100a. The supply unit 100a contains tanks (1, 3, 5, 7, 11), metering feeders (2, 4), and metering pumps (6, 8, 12). The polymerization reaction device main body 100b contains a blending device 9 provided at one end of the polymerization reaction device main body 100b, a feeding pump 10, a reaction vessel 13, a metering pump 14, and an extrusion cap 15 provided the other end of the polymerization reaction device main body 100b. Note that, in the present embodiment, a device configured to mix a compressive fluid with raw materials or a polymer to dissolve or melt the raw materials is called a "blending device." In the present embodiment, the term "melt" means that raw materials or a generated polymer product is plasticized or liquidized with swelling as a result of the contact between the raw materials or generated polymer product, and the compressive fluid. Moreover, the term "dissolve" means that the raw materials are dissolved in the compressive fluid.

The tank 1 of the supply unit 100a stores a ring-opening polymerizable monomer. The ring-opening polymerizable monomer to be stored may be a powder or liquid. The tank 3 stores solids (powder or particles) among the materials used as an initiator and additives. The tank 5 stores liquids among the materials used as the initiator and additives. The tank 7 stores a compressive fluid. Note that, the tank 7 may store gas or a solid that is transformed into a compressive fluid upon application of heat or pressure during the process for supplying to the blending device 9, or within the blending device 9. In this case, the gas or solid stored in the tank 7 is transformed into the state of (1), (2), or (3) of FIG. 2 in the blending device 9 upon application of heat or pressure.

The metering feeder 2 measures the ring-opening polymerizable monomer stored in the tank 1 and continuously supplies the measured ring-opening polymerizable monomer to the blending device 9. The metering feeder 4 measures the solids stored in the tank 3 and continuously supplies the measured solids to the blending device 9. The metering pump 6 measures the liquids stored in the tank 5 and continuously supplies the measured liquids to the blending device 9. The metering pump 8 continuously supplies the compressive fluid stored in the tank 7 to the blending device 9 at the constant pressure and constant flow rate. Note that, in the present embodiment, the phrase "continuously supply" is used as a concept in reverse to a supply per batch, and means to supply in a manner that a polymer, which is obtained through ring-opening polymerization of the ring-opening polymerizable monomer, is continuously obtained. Specifically, each material may be intermittently supplied as long as the polymer obtained through the ring-opening polymerization of the ring-opening polymerizable monomer is continuously obtained. In the case both the initiator and the additives are solids, the polymerization reaction device 100 may not contains the tank 5 and the metering pump 6. In the case where both the initiator and the additives are liquids, similarly, the polymerization reaction device 100 may not contain the tank 3 and the metering feeder 4.

The devices equipped in the polymerization reaction device main body 100b are connected to each other with a pressure resistant piping 30, through which the raw materials, compressive fluid, or generated polymer are transported, as illustrated in FIG. 3. Moreover, each of the blending device 9, feeding pump 10, and reaction vessel 13 of the, polymerization reaction device has a tube-shaped member through which the aforementioned raw materials are transported.

The blending device 9 of the polymerization reaction device main body 100b is a device containing a pressure resistant vessel configured to continuously bring the raw materials, such as the ring-opening polymerizable monomer, the initiator, and the additives supplied from each tank (1, 3, 5) into contact with the compressive fluid supplied from the tank 7 to dissolve the raw materials. In the blending device 9, the raw materials are melted or dissolved by the contact with the compressive fluid. In the case where the ring-opening polymerizable monomer is dissolved, a fluid phase is formed. In the case where the ring-opening polymerizable monomer is melted, a melt phase is formed. It is preferred that one phase of either the melt phase of the fluid phase be formed for uniformly carrying out a reaction. In order to carry out the reaction in the state that a ratio of the raw materials is high relative to the compressive fluid, moreover, the ring-opening polymerizable monomer is preferably melted. Note that, in the present embodiment, the raw materials, such as the ring-opening polymerizable monomer, can be continuously brought into contact with the compressive fluid at the constant ratio of concentration in the blending device 9 by continuously supplying the raw materials and the compressive fluid. As a result, the raw materials can be efficiently dissolved or melted.

A shape of the vessel of the blending device 9 may be a tank shape or a tube shape, but it is preferably a tube from one end of which the raw materials are supplied, and from the other end of which the mixture is taken out. The vessel of the blending device 9 has an inlet 9a from which the compressive fluid supplied from the tank 7 by the metering pump 8 is introduced, an inlet 9b from which the ring-opening polymerizable monomer supplied from the tank 1 by the metering feeder 2 is introduced, an inlet 9c from which the powder supplied from the tank 3 by the metering feeder 4 is introduced, and an inlet 9d from which the liquids supplied from the tank 5 by the metering pump 6 are introduced. In the present embodiment, each inlet (9a, 9b, 9c, 9d) is composed of a connector for connecting the vessel of the blending device 9 with each pipe for transporting each of the raw materials or the compressive fluid. The connector is not particularly limited, and selected from conventional connectors, such as reducers, couplings, Y, T, and outlets. Moreover, the blending device 9 is equipped with a heater 9e configured to heat the supplied the raw materials and the compressive fluid. Further, the blending device 9 may contain a stirring device configured to stir the raw materials, and the compressive fluid. In the case where the blending device 9 is equipped with the stirring device, the stirring device is preferably a single screw stirring device, a twin-screw stirring device where screws are engaged with each other, a biaxial mixer containing a plurality of stirring elements which are engaged or overlapped with each other, a kneader containing spiral stirring elements which are engaged with each other, or a static mixer. Especially, the two-axial or multi-axial stirring device is preferable because there is a less amount of the deposited reaction product on the stirring device or the container, and it has self-cleaning properties.

In the case where the blending device 9 does not contain a stirring device, a pressure resistant pipe is suitably used as the blending device 9. In this case, an installation space of the polymerization reaction device 100 can be reduced, or a degree of freedom in the layout can be improved by providing the pressure resistant pipe in a spiral form or folded form. Note that, in the case where the blending device 9 does not contain a stirring device, the ring-opening polymerizable monomer to be supplied to the blending device 9 is preferably liquidized in advance to make sure that materials are mixed in the blending device 9.

The feeding pump 10 is configured to feed the raw materials dissolved or melted in the blending device 9 to the reaction vessel 13. The tank 11 stores therein a basic organic metal catalyst. The metering pump 12 is configured to measure the basic organic metal catalyst stored in the tank 11, and to supply the basic organic metal catalyst to the reaction vessel 13.

The reaction vessel 13 is a pressure resistant vessel configured to mix the dissolved or melted raw materials fed by the feeding pump 10 with the basic organic metal catalyst supplied by the metering pump 12, to thereby continuously polymerize the ring-opening polymerizable monomer through ring-opening polymerization. A shape of the reaction vessel 13 may be a shape of a tank or tube, but it is preferably a tube shape, as it gives less dead space. To the reaction vessel 13, provided are an inlet 13a, from which the raw materials mixed by the blending device 9 are introduced into the vessel, and an inlet 13 b, from which the basic organic metal catalyst supplied from the tank 11 by the metering pump 12 is introduced into the vessel. In the present embodiment, each inlet (13a, 13b) is composed of a connector for connecting the reaction vessel 13 with each piping for transporting each raw material. The connector is not particularly limited, and selected from conventional connectors, such as reducers, couplings, Y, T, and outlets. Note that, a gas outlet for removing evaporated products may be provided to the reaction vessel 13. Moreover, the reaction vessel 13 contains a heater 13c for heating the fed raw materials. Furthermore, the reaction vessel 13 may contain a stirring device configured to stir the raw materials and the compressive fluid. In the case where the reaction vessel 13 contains a stirring device, a polymerization reaction can be progressed more uniformly and quantitatively, as the settlement of the polymer, which may be caused by a difference in density between the raw materials and the generated polymer, can be prevented. As for the stirring device of the reaction vessel 13, preferred is a dual- or multi-axial stirrer having screws engaging with each other, stirring elements of 2-flights (rectangle), stirring elements of 3-flights (triangle), or circular or multi-leaf shape (clover shape) stirring wings, in view of self-cleaning. In the case where raw materials including the catalyst are sufficiently mixed in advance, a motionless mixer, which divides and compounds (recombines) the flows in multiple stages, can also be used as the stirring device. Examples thereof include multiflux batch mixers disclosed in Japanese examined patent application publication (JP-B) Nos. 47-15526, 47-15527, 47-15528, and 47-15533; a Kenics-type mixer disclosed in Japanese Patent Application Laid-Open (JP-A) No. 47-33166; and motionless mixers similar to those listed. The descriptions thereof are incorporated herein for reference.

In the case where reaction vessel 13 does not contain a stirring device, a pressure resistant pipe can be suitably used as the reaction vessel 13. In this case, an installation space of the polymerization reaction device 100 can be reduced, or a degree of freedom in the layout can be improved by providing the pressure resistant pipe in a spiral form or folded form.

FIG. 3 illustrates an example where one reaction vessel 13 is provided, but two or more reaction vessels 13 can be also used. In the case where a plurality of the reaction vessels 13 are used, reaction (polymerization) conditions (e.g., temperature, catalyst concentration, pressure, average retention time, and stirring speed) for each reaction vessel 13 may be identical, but it is preferred that optimal conditions for each reaction vessel be selected depending on the progress of the polymerization. Note that, it is not very good idea that excessively large number of the reaction vessels 13 is connected to give many stages, as it may extend a reaction time, or a device may become complicated. The number of stages is preferably 1 to 4, more preferably 1 to 3.

In the case where polymerization is performed by means of a device having only one reaction vessel, it is typically believed that such device is not suitable for industrial production, as a degree of polymerization or an amount of monomer residue of the polymer product obtained through ring-opening polymerization of the ring-opening polymerizable monomer is unstable and tends to be varied. It is considered that the instability thereof is caused by coexistence of the raw materials having the melt viscosity of a few poises to several tends poises, and the polymerized polymer product having the melt viscosity of about 1,000 poises, in the same vessel. In the present embodiment, on the other hand, it is possible to reduce a difference in the viscosity within the system, as the raw materials and the generated polymer are dissolved or melted in the compressive fluid, and therefore a number of stages can be reduced compared to that of a conventional polymerization reaction device.

The metering pump 14 is configured to discharge the polymer product P in the reaction vessel 13 from the extrusion cap 15 that is one example of a polymer outlet. Note that, the polymer product P can be also discharged from the reaction vessel 13 without using the metering pump 14 by utilizing the pressure difference between inside and outside the reaction vessel 13. In this case, a pressure control valve may be used instead of the metering pump 14 in order to adjust the internal pressure of the reaction vessel 13 or the discharging rate of the polymer product P. Moreover, the timing for applying heat or stirring to the raw materials and the compressive fluid in the reaction vessel 13 may be adjusted in order to efficiently melt the raw materials. In this case, heating or stirring may be performed after bringing the raw materials into contact with the compressive fluid, or while the raw materials are brought into contact with the compressive fluid. Alternatively, heat equal to or higher than a melting point of the ring-opening polymerizable monomer is applied to melt the ring-opening polymerizable monomer in advance, and then the ring-opening polymerizable monomer may be brought into contact with the compressive fluid.

Subsequently, the polymerization reaction device 200 for use in the production of a batch system is explained with reference to FIG. 4. FIG. 4 is a system diagram illustrating one example of a polymerization step of a batch system. In the system diagram of FIG. 4, the polymerization reaction device 200 contains a tank 21, a metering pump 22, an addition pot 25, a reaction vessel 27, and valves (23, 24, 26, 28, 29). The aforementioned devices are each connected to each other with pressure resistant piping 30, as illustrated in FIG. 4. Moreover, connectors (30a, 30b) are included in the piping 30.

The tank 21 stores therein a compressive fluid. Note that, the tank 21 may store gas or a solid that is transformed into a compressive fluid upon application of heat or pressure during the process for supplying to the reaction vessel 27 or within the reaction vessel 27. In this case, the gas or solid stored in the tank 21 is transformed into the state of (1), (2), or (3) of FIG. 2 in the reaction vessel 27 upon application of heat or pressure.

The metering pump 22 configured to supply the compressive fluid stored in the tank 21 to the reaction vessel 27 at the constant pressure and constant flow rate. The addition pot 25 stores therein a basic organic metal catalyst to be added to the raw materials in the reaction vessel 27. The valves (23, 24, 26, 29) are open or closed to switch between a pass for supplying the compressive fluid stored in the tank 21 to the reaction vessel 27 via the addition pot 25, and a pass for supplying the compressive fluid to the reaction vessel 27 without going through the addition pot 25.

Before starting polymerization, the ring-opening polymerizable monomer, and the initiator are accommodated in the reaction vessel 27 in advance. The reaction vessel 27 is a pressure resistant vessel configured to bring the ring-opening polymerizable monomer and the initiator accommodated in advance, the compressive fluid supplied from the tank 21, and the catalyst supplied from the addition pot 25 into contact with each other to polymerize the ring-opening polymerizable monomer through ring-opening polymerization. Note that, a gas outlet for removing evaporated products may be provided to the reaction vessel 27. Moreover, the reaction vessel 27 contains a heater for heating the raw materials and the compressive fluid. Furthermore, the reaction vessel 27 contains a stirring device for stirring the raw materials and the compressive fluid. When a difference in the density between the raw material and the generated polymer is generated, the settlement of the generated polymer can be prevented by stirring with the stirring device. Therefore, the polymerization reaction can be performed more uniformly and quantitatively. The valve 28 is opened after completing the polymerization reaction, to discharge the polymer product P in the reaction vessel 27.

<Embodiment of Method for Producing Polymer>

Subsequently, a method for producing a polymer using the aforementioned raw materials, compressive fluid, and polymerization reaction device 100 is explained. In accordance with the method for producing a polymer of the present embodiment, raw materials containing a ring-opening polymerizable monomer containing an amide bond are brought into contact with a compressive fluid to melt or dissolve the ring-opening polymerizable monomer containing an amide bond, followed by allowing the ring-opening polymerizable monomer containing an amide bond to polymerize through ring-opening polymerization in the presence of a basic organic metal catalyst, and a cocatalyst.

First, each metering feeder (2, 4), the metering pump 6, and the metering pump 8 are operated to continuously supply the ring-opening polymerizable monomer, the compressive fluid, optional initiator, and optional additives stored in each of the tanks (1, 3, 5, 7) into the blending device 9. Note that, a cocatalyst among the catalysts for use may be stored in any one of tanks (1, 3, 5), and the cocatalyst may be supplied to the blending device 9 by the metering feeder (2, 4) or the metering pump 6. The raw materials and compressive fluid supplied from each device are continuously introduced into the tube of the blending device 9 from each inlet (9a, 9b, 9c, 9d). Note that, the solid (powder or particles) raw materials may have low accuracy in measuring compared to the liquid raw materials. In this case, the solid raw materials are melted in advance and stored in the state of the liquid in the tank 5, to thereby introduce into the tube of the blending device 9 using the metering pump 6. An order for operating the metering feeders (2, 4), metering pump 6, and metering pump 8 is not particularly limited, but the metering pump 8 is preferably operated first, because the raw materials may be solidified due to reduction in temperature, if the initial raw materials are sent to the reaction vessel 13 without being in contact with the compressive fluid.

The feeding speed of each raw material by each of the metering feeders (2, 4), and metering pump 6 is adjusted to give a constant ratio based on the predetermined blending ratio of the ring-opening polymerizable monomer, initiator, catalyst, and additives. A total mass of the raw materials supplied by the metering feeders (2, 4) and the metering pump 6 per unit time (feeding speed of the raw materials (g/min)) is adjusted based on the desired physical properties of a resulting polymer, and reaction time. Similarly, a mass of the compressive fluid supplied by the metering pump 8 per unit time (feeding speed of the compressive fluid (g/min)) is adjusted based on the desired physical properties of a resulting polymer, and reaction time. A ratio of the feeding speed of the raw materials to the feeding speed of the compressive fluid (feeding speed of raw materials/feeding speed of compressive fluid, which is referred to as a feeding ratio) is appropriately selected depending on the intended purpose without any limitation, but it is preferably 1 or greater, more preferably 3 or greater, even more preferably 5 or greater, and particularly preferably 10 or greater. Moreover, the upper limit of the feeding ratio is appropriately selected depending on the intended purpose without any limitation, but it is preferably 1,000 or less, more preferably 100 or less, and particularly preferably 50 or less.

By setting the feeding ratio to 1 or greater, a reaction progresses with the high concentration of the raw materials and a polymer product as generated (i.e. high solid content), when the raw materials and the compressive fluid are sent to the reaction vessel 13. The solid content in the polymerization system here is largely different from a solid content in a polymerization system where polymerization is performed by dissolving a small amount of a ring-opening polymerizable monomer in a significantly large amount of a compressive fluid in accordance with a conventional production method. The production method of the present embodiment is characterized by that a polymerization reaction progresses efficiently and stably in a polymerization system having a high solid content. Note that, in the present embodiment, the feeding ratio may be less than 1. Even in this case, there is no problem in qualities of a resulting polymer product, but economic efficiency thereof is not satisfactory. When the feeding ratio is greater than 1,000, moreover, there is a possibility that the compressive fluid may not sufficiently dissolve the ring-opening polymerizable monomer therein, and the intended reaction may not be uniformly carried out.

The raw materials and the compressive fluid are continuously brought into contact with each other, as the raw materials and the compressive fluid are each continuously introduced into the pipe of the blending device 9. As a result, each of the raw materials, such as the ring-opening polymerizable monomer, initiator, and additives, are mixed in the blending device 9, to thereby melt or dissolve the ring-opening polymerizable monomer. In the case where the blending device 9 is equipped with a stirring device, the raw materials and the compressive fluid may be stirred. In order to prevent the introduced compressive fluid from turning into gas, the internal temperature and pressure of the pipe of the reaction vessel 13 are preferably controlled to the temperature pressure both equal to or higher than at least a triple point of the compressive fluid. Note that, the pressure is controlled, for example, by a flow rate of the pump, a diameter of the pipe, a length of the pipe, or a shape of the pipe. Moreover, this control can be also performed by adjusting output of a heater 9e of the blending device 9, or a feeding rate of the compressive fluid.

In the present embodiment, the pressure at which the ring-opening polymerizable monomer is melted or dissolved may be the temperature that is equal to or lower than a melting point of the ring-opening polymerizable monomer containing an amide bond at atmospheric pressure. It is assumed that the internal pressure of the blending device 9 becomes high in the presence of the compressive fluid so that the melting point of the ring-opening polymerizable monomer becomes lower than the melting point thereof under the atmospheric pressure. Accordingly, the ring-opening polymerizable monomer is melted or dissolved in the blending device 9, even when an amount of the compressive fluid is small with respect to the ring-opening polymerizable monomer.

In order to mix the raw materials efficiently, the timing for applying heat to, or stirring the raw materials and the compressive fluid in the blending device 9 may be adjusted. In this case, heating or stirring may be performed after bringing the raw materials and the compressive fluid into contact with each other, or heating or stirring may be performed while ringing the raw materials and the compressive fluid into contact with each other. To make mixing even better, for example, the ring-opening polymerizable monomer and the compressive fluid may be brought into contact with each other after heating the ring-opening polymerizable monomer at the temperature equal to or higher than the melting point thereof. Each of the aforementioned embodiments for mixing is realized, for example, appropriately setting an alignment of screws, arrangement of inlets (9a, 9b, 9c, 9d), and the temperature of the heater 9e, in the case where the blending device 9 is a biaxial blending device.

Note that, in the present embodiment, the additives are supplied to the blending device 9 separately from the ring-opening polymerizable monomer, but the additives may be added together with the ring-opening polymerizable monomer. Moreover, the additives may be supplied after completing the polymerization reaction. In this case, the additives can be added with kneading after taking out the obtained polymer product from the reaction vessel 13.

The raw materials mixed in the blending device 9 are sent by the feeding pump 10, and supplied to the reaction vessel 13 from the inlet 13a. In the case where the catalyst mixture is added after mixing, the catalyst mixture in the tank 11 is measured by the metering pump 12, and the predetermined amount of the catalyst mixture is supplied to the reaction vessel 13 from the inlet 13b. An order for adding the basic organic metal catalyst and the cocatalyst to the ring-opening polymerizable monomer is arbitrarily selected.

The raw materials and the catalyst are optionally sufficiently stirred by a stirring device of the reaction vessel 13, or heated to the predetermined temperature (polymerization reaction temperature) by the heater 13c during transported. As a result, the ring-opening polymerizable monomer is polymerized through ring-opening polymerization in the presence of the catalyst in the reaction vessel 13 (polymerization step). The temperature at which the ring-opening polymerizable monomer is ring-opening polymerized (polymerization reaction temperature) is appropriately selected depending on the intended purpose without any limitation, but the polymerization reaction temperature is preferably 100° C. to 200° C., more preferably 120° C. to 180° C. When the polymerization reaction temperature is lower than 100° C., the reaction speed may be slow. When the polymerization reaction temperature is higher than 200° C., a side reaction may occur. However, ring-opening polymerization of the ring-opening polymerizable monomer may be carried out at the temperature outside the aforementioned range depending on a combination of the compressive fluid, ring-opening polymerizable monomer, and catalyst. Note that, the polymerization reaction temperature can be controlled, for example, by heating with a heater provided to the polymerization reaction device, or externally heating.

In the present embodiment, the polymerization reaction time (the average retention time in the reaction vessel 13) is set depending on the target molecular weight. In the case where the target molecular weight is 5,000 to 500,000, for example, the polymerization reaction time is 30 minutes to 120 minutes.

The polymer product P, which has completed the ring-opening polymerization reaction in the reaction vessel 13, is discharged from the reaction vessel 13 by the metering pump 14. The speed for discharging the polymer product P by the metering pump 14 is preferably set constant by setting the pressure in the polymerization system, which is filled with the compressive fluid, constant to operate and attain a uniform polymer product. To this end, the feeding system inside the reaction vessel 13 and the feeding rate of the feeding pump 10 are controlled to make the back pressure of the metering pump 14 constant. In order to maintain the back pressure of the feeding pump 10 constant, the feeding system inside the blending device 9, and the feeding speed of each of the metering feeders (2, 4), and metering pumps (6, 8) are controlled. The control system may be an ON-OFF control system, i.e., an intermittent feeding system, but it is in most cases preferably a continuous or stepwise control system where the rational speed of the pump or the like is gradually increased or decreased. Any of these controls realizes to stably provide a uniform polymer product.

The catalyst remained in the polymer product obtained in the present embodiment is removed according to the necessity. The removal method is not particularly limited, and examples thereof include vacuum distillation, and extraction using a compressive fluid. In the case where the vacuum distillation is performed, the vacuuming conditions are set based on the boiling point of the catalyst. For example, the temperature for vacuuming is 100° C. to 120° C., and the catalyst can be removed at temperature lower than the temperature at which the polymer product is depolymerized. Therefore, the compressive fluid is preferably used as a solvent in the extraction process. As for such extraction process, a conventional technique, such as extraction of perfume, can be applied.

The pressure at the time of the polymerization, i.e., the pressure of the compressive fluid, may be the pressure at which the compressive fluid supplied from the tank 7 becomes liquid gas ((2) in the phase diagram of FIG. 2), or higher pressure gas ((3) in the phase diagram of FIG. 2), but it is preferably the pressure at which the compressive fluid is turned into a supercritical fluid ((1) in the phase diagram of FIG. 2). By turning the compressive fluid into a supercritical fluid, melting of the ring-opening polymerizable monomer is accelerated, and a polymerization reaction can be progressed uniformly and quantitatively. Note that, dimethyl ether is used as a compressive fluid, the pressure thereof is 2.7 MPa or higher, preferably 5 MPa or higher, and more preferably 5.4 PMa (critical pressure) or higher, in view of the reaction efficiency, and polymerization rate.

In the production method of the present embodiment, the polymerization rate from the ring-opening polymerizable monomer to the polyamide as a result of ring-opening polymerization is 98 mol % or greater, preferably 99 mol % or greater. When the polymerization rate is lower than 98 mol %, thermal properties of polyamide may be insufficient, or it may be necessary to additionally give a treatment for removing ring-opening polymerizable monomer residues. In the present embodiment, the polymerization rate from the ring-opening polymerizable monomer to polyamide means a ratio of an amount of the ring-opening polymerizable monomer contributed to generation of a polymer relative to an amount of the ring-opening polymerizable monomer as a raw material and a cyclic oligomer that is a by-product. The amount of the monomer contributed to the generation of polyamide is determined by subtracting an amount of the unreacted ring-opening polymerizable monomer from the amount of the generated polyamide.

The weight average molecular weight of the polymer obtained in the present embodiment can be adjusted with the amount of the initiator. The weight average molecular weight thereof is not particularly limited, but it is typically 5,000 to 500,000. When the weight average molecular weight thereof is greater than 500,000, productivity may be low due to increased viscosity, and it may not be economical. When the weight average molecular weight is smaller than 5,000, strength of the polymer may be insufficient as functioning as a polymer and hence not preferable.

<Monomer and Oligomer Content>

As mentioned above, a polymerization reaction can be performed at low temperature by using a compressive fluid in the production method of the present embodiment, and therefore, a depolymerization reaction can be significantly suppressed compared to a conventional melt polymerization. Therefore, the an amount of the ring-opening polymerizable monomer and oligomer remained (monomer and oligomer content) in the polymer product obtained in the production method of the present embodiment is 2% by mass or less, preferably 1.5% by mass or less, more preferably 1.0% by mass or less. In the present embodiment, the oligomer means a dimmer, trimer, and tetramer of the monomer. When the monomer and oligomer content is greater than 2% by mass, heat resistant storage stability is lowered due to reduction in thermal properties, and decomposition of a resulting monomer tends to occur. In accordance with the present embodiment, a polymer product having the monomer and oligomer content of 2% by mass or less can be attained by appropriately selecting the aforementioned polymerization reaction conditions, without additionally performing a removal treatment. Examples of the measuring method of the monomer and oligomer content include the method described in Examples explained later.

<Use of Polymer>

The polymer obtained by the production method of the present embodiment is produced by a method that does not use an organic solvent, and contains a little amount of monomer residues, and therefore the polymer has excellent safety and stability. Note that, the organic solvent means an organic compound that is a liquid at room temperature (25° C.), and atmospheric pressure, and is different from a compressive fluid. The polymer obtained by the production method of the present embodiment is, for example, formed into particles, a film, a sheet, a molded article, or fibers, to widely used for commodities, industrial materials, agricultural products, sanitation materials, medical products, cosmetic products, electrophotographic toner, packaging materials, materials of electric devices, housings of appliances, and materials for automobiles.

<Effects of Method for Producing Polymer>

A ring-opening polymerizable monomer is reacted at high temperature, which is the temperature equal to or higher than the melting point thereof, in a conventional melt polymerization method of a ring-opening polymerizable monomer, and therefore unreacted monomers are remained in a polymer product (polyamide). As a result, a step for removing the unreacted monomer may be required. In the case where solution polymerization is performed using a solvent, moreover, a step for removing the solvent is required in order to use the obtained polyamide as a solid. Specifically, both conventional methods cannot avoid increased number of steps in the production, or increased cost due to a low yield. In accordance with the polymerization method of the present embodiment, a polymer having excellent formability, and heat stability can be provided in a manner, which is excellent in terms of low cost, low environmental load, energy saving, and resource saving, by controlling a supplying amount of the compressive fluid.

Moreover, the production method of the present embodiment exhibits the following effects.

(1) In the case where a ring-opening polymerizable monomer containing an amide bond is polymerized through ring-opening polymerization in accordance with a conventional anionic polymerization method, a polymer product is solidified as the reaction is progressed, and therefore the following reaction becomes uneven, or a shape of a polymer product or a method for taking out the polymer product is limited.

In accordance with the production method of the present embodiment, a polymer product can be taken out in a melted state, even when polymerization is performed at the temperature equal to or lower than a melting point of the polymer at room temperature. Therefore, a shape of the polymer product, or a degree of freedom when the polymer product is taken out from the reaction vessel is improved. Moreover, a polymer can be continuously produced. Note that, the phrase "a shape of the polymer product, or a degree of freedom when the polymer product is taken out from the reaction vessel is improved" means that a shape of a polymer product or a method for taking out the polymer product, which has been impossible in a conventional production method where the polymer product is solidified in the middle of the reaction, can be realized. Examples of the method for taking out the polymer product include a method where a polyamide composition in the reaction vessel is taken out in the form of strands. Moreover, examples of the shape thereof include a pellet formed by merely cutting the polymer product taken out in the form of the strands, and a film formed by merely molding the polymer product.

(2) The reaction progresses at low temperature compared to ring-opening polymerization of a ring-opening polymerizable monomer containing an amide bond in a melted state at temperature equal to or higher than the melting point in accordance with a conventional production method. Therefore, a side reaction hardly occurs. As a result, a polymer product is attained at high yield relative to the ring-opening polymerizable monomer for use (in other words, a less amount of ring-opening polymerizable monomer or oligomer residues), without containing a gel component insoluble to a solvent, such as hexafluoroisopropanol. Accordingly, a purification step, such as removal of the ring-opening polymerizable monomer or oligomer, performed for attaining a polymer having excellent formability and heat stability can be simplified or omitted.

(3) A polymer (polyamide) can be continuously attained at relatively low temperature (equal to or lower than the melting point of the generated polymer) within a short period through ring-opening polymerization of the ring-opening polymerizable monomer (cyclic amide compound).

(4) In a polymerization method using an organic solvent, it is necessary to provide a step for removing the solvent in order to use the obtained polymer as a solid. In the polymerization method of the present embodiment, a waste liquid is not generated, as a compressive fluid is used, and a dried polymer can be attained in one stage. Therefore, the drying step can be simplified or omitted.

(5) Both the desirable polymerization speed and the desirable polymerization efficiency (a ratio of the polymer in the polymerization system) can be attained by controlling a feeding rate of the compressive fluid.

EXAMPLES

The present embodiment is specifically explained through Examples and Comparative Examples hereinafter, but Examples shall not be construed as to limit the scope of the present invention. Note that, a molecular weight of a polymer obtained in each of Examples and Comparative Examples, and a residual monomer and oligomer content therein were determined in the following manners.

<Measurement of Molecular Weight of Polymer>

The measurement was performed by GPC (Gel Permeation Chromatography) under the following conditions.
Apparatus: GPC-8020 (manufactured by TOSOH CORPORATION)
Column: TSK G2000HXL and G4000HXL (manufactured by TOSOH CORPORATION)
Temperature: 40° C.
Solvent: HFIP (hexafluoroisopropanol)
Flow rate: 1.0 mL/min A polymer sample (1 mL) having a concentration of 0.5% by mass was injected to measure a molecular weight distribution of the polymer under the above conditions. Based on the obtained molecular weight distribution, a number average molecular weight (Mn) and weight average molecular weight (Mw) of the polymer were calculated with reference to a molecular weight calibration curve obtained using a monodisperse polystyrene standard sample. The molecular weight distribution is a value obtained by dividing Mw with Mn.

<Monomer and Oligomer Content>

The polymer product (polyamide) was pulverized, and the resultant, which was passed through 24 mesh of the JIS standard sieve, but not passed through 124 mesh, was collected. The collected polyamide powder (about 20 g) was subjected to Soxhlet extraction with 200 mL of methanol for 3 hours. The amount of the monomer and oligomer contained in the extract (hot water extract component) was determined by high performance liquid chromatography. The measurement conditions are as described below. Note that, before the measurement, the conformation of the column retention time, and the preparation of a calibration curve were carried out. In case of Nylon 6, a calibration curve was prepared using standard samples of caprolactam, cyclic dimmer of caprolactam, cyclic trimer of caprolactam, and cyclic tetramer of caprolactam.
High Performance Liquid Chromatography 600E, manufactured by Waters
Column: ODS-3 manufactured by GL Sciences Inc.
Detector: 484 Tunable Absorbance Detector, manufactured by Waters Detection Wavelength: 254 nm
Injection Volume: 10 μL
Solvent: methanol/water (a composition of methanol/water was set to give a gradient analysis of 20:80 to 80:20 (volume ratio).)
Flow Rate: 1 mL/min Example 1

Figure 4:
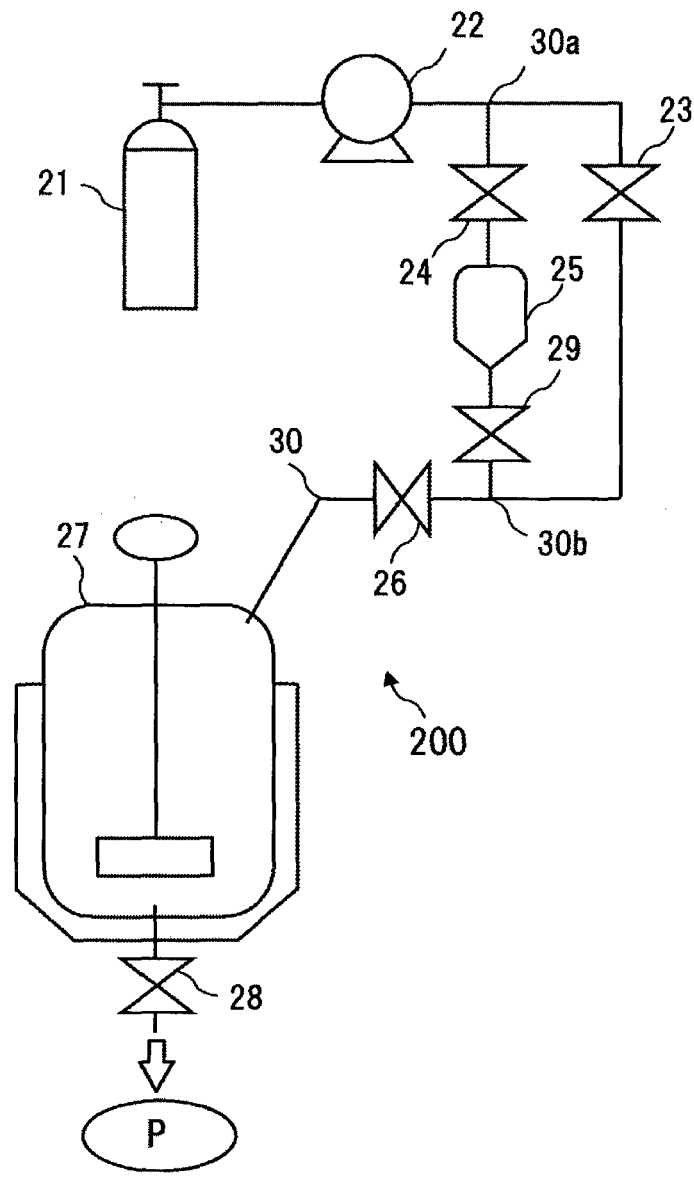
FIG. 4 is a system diagram illustrating one example of a polymerization step is a batch system.

By means of the polymerization reaction device 200 illustrated in FIG. 4, ring-opening polymerization of ε-caprolactam (manufacturer: Tokyo Chemical Industry Co., Ltd.) was carried out. The structure of the polymerization reaction device 200 is described below.
Tank 21: Dimethyl ether (DME) gas cylinder
Addition pot 25: A ¼-inch SUS316 pipe was sandwiched with valves (24, 29), and the resultant was used as an addition pot. The addition pot was charged with 0.12 g of ethylmagnesium bromide (manufacturer: Tokyo Chemical Industry Co., Ltd.) as a basic organic metal catalyst, in advance.
Reaction vessel 27: A 100 mL pressure resistant vessel formed of SUS316 was used. The reaction vessel was charged with 50 g of a mixture composed of ε-caprolactam (manufacturer: Tokyo Chemical Industry Co., Ltd., melting point: 68° C.) as a ring-opening polymerizable monomer, and N-acetylcaprolactam as a cocatalyst at a molar ratio of (99.95/0.05), in advance.

The metering pump 22 was operated, and the valves (23, 26) were opened to supply dimethyl ether stored in the tank 21 to the reaction vessel 27 without going through the addition pot 25. The internal temperature of the reaction vessel 27 was set to 100° C., and the reaction vessel was charged with diethyl ether until the internal pressure thereof became 15 MPa, to thereby melt ε-caprolactam. When the internal temperature of the reaction vessel 27 reached 100° C., the valves (24, 29) were opened to supply ethylmagnesium bromide in the addition pot 25 to the reaction vessel 27. Thereafter, the temperature and pressure were increased, and after the temperature and pressure reached 150° C., 15 MPa, respectively, a polymerization reaction of ε-caprolactam was performed in the reaction vessel 27 for 90 minutes. After the reaction, the valve 28 was opened to take out a polymer product (polyamide) inside the reaction vessel 27. After taking the polyamide out, the polyamide was solidified. The polymer product was subjected to the measurements of the weight average molecular weight and hot water extract component in the aforementioned manners. The results are depicted in Table 1.

Examples 2 to 4

A polymer of each of Examples 2 to 4 was obtained in the same manner as in Example 1, provided that an amount of N-acetyl caprolactam as the cocatalyst was changed as depicted in a respective column of Example 2, 3, or 4 in Table 1. The physical properties of the obtained polymers measured in the aforementioned methods are depicted in Table 1.

Examples 5 to 8

A polymer of each of Examples 5 to 8 was obtained in the same manner as in Example 1, provided that the reaction temperature, reaction pressure, or reaction time was changed as depicted in a respective column of Example 5, 6, 7, or 8 in Table 1 or 2. The physical properties of the obtained polymers measured in the aforementioned methods are depicted in Table 1 or 2.

Examples 9 to 10

Polymers of Examples 9 to 10 were obtained in the same manner as in Example 1, provided that the ring-opening polymerizable monomer containing an amide bond was changed to α-pyrrolidone in Example 9, and to lurolactam in Example 10. The physical properties of the obtained polymers measured in the aforementioned methods are depicted in Table 2.

Examples 11 to 13

Polymers of Examples 11 to 13 were obtained in the same manner as in Example 1, provided that the amount of ε-caprolactam serving as a monomer was changed to 30 g in Example 11, to 10 g in Example 12, and to 2 g in Example 13. The physical properties of the obtained polymers measured in the aforementioned methods are depicted in Table 3.

Reference Example 1

The same operations as in Example 1 were performed, provided that a type of the compressive fluid was changed to the one depicted in the column of Reference Example 1 in Table 3. The contents in the reaction vessel 27 after the operations were subjected to a measurement of GPC. The results are depicted in Table 3. Only a peak corresponding the monomer could be detected from the obtained GPC curve, and hence it was judged that the monomer was not polymerized.

Example 14

By means of the polymerization reaction device 100 illustrated in FIG. 3, ring-opening polymerization of ε-caprolactam was carried out. The structure of the polymerization reaction device 100 is described below.
Tank 1, Metering Feeder 2:
Plunger pump NP-S462, manufactured by Nihon Seimitsu Kagaku Co., Ltd.
The tank 1 was charged in a melted state of ε-caprolactam, which was set to have a moisture content of 0.01 mol % (15 ppm) by massing through an anaerobic dry nitrogen flow in the liquid for 3 hours, and which was heated at 150° C.
Tank 3, Metering Feeder 4:
Intelligent HPLC pump (PU-2080), manufactured by JASCO Corporation
The tank 3 was charged with N-acetylcaprolactam as a cocatalyst.
Tank 5, Metering Pump 6: Not used in Example 14.
Tank 7: Compressive fluid cylinder charged with dimethyl ether
Tank 11, Metering Pump 12:
Intelligent HPLC pump (PU-2080), manufactured by JASCO Corporation
The tank 11 was charged with (ethylmagnesium bromide, manufacturer: Tokyo Chemical Industry Co., Ltd.) (basic organic metal catalyst).

Blending Device 9: A twin-screw stirring device equipped with screws engaged with each other
  Inner diameter of cylinder: 30 mm
  Set temperature of cylinder: 150° C.
  Identical biaxial rotational directions
  Rotational speed: 30 rpm
Reaction Vessel 13: Biaxial kneader
  Inner diameter of cylinder: 40 mm
  Set temperature of cylinder: 150° C. (raw material supply section), 200° C. (edge)
  Identical biaxial rotational directions
  Rotational speed: 60 rpm The twin-screw stirring device of the blending device 9 and the biaxial kneader of the reaction vessel 13 were operated under the above conditions. The metering feeder 2 supplied the melted ε-caprolactam stored in the tank 1 into a container of the twin-screw stirring device at a constant rate. The metering feeder 4 supplied N-acetylcaprolactam stored in the tank 3 into the container of the twin-screw stirring device at a constant rate in the manner that a molar ratio of ε-caprolactam to N-acetylcaprolactam (i.e., ε-caprolactam/N-acetylcaprolactam) was to be 99.95/0.05. The metering pump 8 supplied dimethyl ether (DME) as a compressive fluid from the tank 7 into the container of the twin-screw stirring device in the manner that the pressure inside the container was to be 15 MPa.

As a result, 100% by mass of the raw materials, such as ε-caprolactam, and N-acetylcaprolactam (a total amount of ε-caprolactam and N-acetylcaprolactam) supplied from each tank (1, 3, 7), were continuously brought into contact with, and mixed with 10% by mass of the compressive fluid by the screws of the twin-screw stirring device, as well as melting each raw material.

The raw materials melted in the blending device 9 were sent to the reaction vessel 13 by the feeding pump 10. The metering pump 12 supplied ethylmagnesium bromide as a polymerization catalyst stored in the tank 11 to a raw material supply inlet of the biaxial kneader as the reaction vessel 13, in the manner that the amount thereof was to be 0.50 mol % relative to the ε-caprolactam. In the biaxial kneader, the raw materials fed by the feeding pump 10 and the ethylmagnesium bromide supplied by the metering pump 12 were mixed, and the ε-caprolactam was allowed to react through ring-opening polymerization. As for the reaction, the average retention time of the raw materials in the biaxial kneader was about 1,200 seconds (20 minutes), which was determined as a reaction time. At the edge of the biaxial kneader, a metering pump 14, and an extrusion cap 15 were provided. The feeding speed of the polymer (polyamide) as a generated product by the metering pump 14 was 200 g/min. After taking out the obtained polymer product, the polymer product was solidified. The physical properties of the obtained polymer product were measured in the aforementioned methods. The results are presented in Table 3.

TABLE 1

|  | Ex. 1 | Ex. 2 | Ex. 3 | Ex. 4 | Ex. 5 | Ex. 6 |
|---|---|---|---|---|---|---|
| Monomer | ε-caprolactam | ε-caprolactam | ε-caprolactam | ε-caprolactam | ε-caprolactam | ε-caprolactam |
| Compressive fluid | Dimethyl ether | Dimethyl ether | Dimethyl ether | Dimethyl ether | Dimethyl ether | Dimethyl ether |
| Catalyst | Ethyl magnesium bromide | Ethyl magnesium bromide | Ethyl magnesium bromide | Ethyl magnesium bromide | Ethyl magnesium bromide | Ethyl magnesium bromide |
| Cocatalyst | N-acetyl caprolactam | N-acetyl caprolactam | N-acetyl caprolactam | N-acetyl caprolactam | N-acetyl caprolactam | N-acetyl caprolactam |
| Amount of cocatalyst (mol % (relative to monomer)) | 0.05 | 0.03 | 0.10 | 0.15 | 0.05 | 0.05 |
| Reaction time (min) | 90 | 90 | 90 | 90 | 240 | 240 |
| Reaction temp. (° C.) | 150 | 150 | 150 | 150 | 120 | 180 |
| Reaction pressure (MPa) | 15 | 15 | 15 | 15 | 15 | 15 |
| Mw | 187,000 | 246,000 | 114,000 | 75,000 | 160,000 | 194,000 |
| Monomer/oligomeer content (mass %) | 1.5 | 2.0 | 1.2 | 1.4 | 1.1 | 1.6 |

TABLE 2

|  | Ex. 7 | Ex. 8 | Ex. 9 | Ex. 10 |
|---|---|---|---|---|
| Monomer | ε-caprolactam | ε-caprolactam | α-pyrrolidone | laurolactam |
| Compressive fluid | Dimethyl ether | Dimethyl ether | Dimethyl ether | Dimethyl ether |
| Catalyst | Ethyl magnesium bromide | Ethyl magnesium bromide | Ethyl magnesium bromide | Ethyl magnesium bromide |
| Cocatalyst | N-acetyl caprolactam | N-acetyl caprolactam | N-acetyl caprolactam | N-acetyl caprolactam |
| Amount of cocatalyst (mol % (relative to monomer)) | 0.05 | 0.05 | 0.05 | 0.05 |
| Reaction time (min) | 240 | 240 | 90 | 90 |
| Reaction temp. (° C.) | 150 | 150 | 150 | 150 |
| Reaction pressure (MPa) | 10 | 30 | 15 | 15 |
| Mw | 182,000 | 180,000 | 115,000 | 244,000 |
| Monomer/oligomeer content (mass %) | 1.5 | 0.8 | 1.7 | 1.8 |

TABLE 3

| | Ex. 11 | Ex. 12 | Ex. 13 | Ex. 14 | Ref. Ex. 1 |
|---|---|---|---|---|---|
| Monomer | ε-caprolactam | ε-caprolactam | ε-caprolactam | ε-caprolactam | ε-caprolactam |
| Compressive fluid | Dimethyl ether | Dimethyl ether | Dimethyl ether | Dimethyl ether | Carbon dioxide |
| Catalyst | Ethyl magnesium bromide | Ethyl magnesium bromide | Ethyl magnesium bromide | Ethyl magnesium bromide | Ethyl magnesium bromide |
| Cocatalyst | N-acetyl caprolactam | N-acetyl caprolactam | N-acetyl caprolactam | N-acetyl caprolactam | N-acetyl caprolactam |
| Amount of cocatalyst (mol % (relative to monomer)) | 0.05 | 0.05 | 0.05 | 0.05 | 0.05 |
| Reaction time (min) | 90 | 90 | 90 | 20 | 90 |
| Reaction temp. (° C.) | 150 | 150 | 150 | 150 | 150 |
| Reaction pressure (MPa) | 15 | 15 | 15 | 15 | 15 |
| Mw | 196,000 | 172,000 | 168,000 | 147,000 | Not polymerized |
| Monomer/oligomeer content (mass %) | 1.5 | 1.8 | 2.1 | 1.9 | — |

The embodiments of the present invention are, for example, as follows:

<1> A method for producing a polymer, containing:
bringing a ring-opening polymerizable monomer containing an amide bond, and a compressive fluid into contact with each other to melt or dissolve the ring-opening polymerizable monomer containing an amide bond, followed by allowing the ring-opening polymerizable monomer containing an amide bond to react through ring-opening polymerization in the presence of a basic organic metal catalyst and a cocatalyst, to thereby obtain a polymer product.
<2> The method according to <1>, wherein the compressive fluid contains ether or hydrocarbon.
<3> The method according to <1> or <2>, wherein the compressive fluid contains dimethyl ether.
<4> The method according to any one of <1> to <3>, wherein a monomer and oligomer content in the polymer product is 2% by mass or smaller.
<5> The method according to any one of <1> to <4>, wherein the polymer product has a weight average molecular weight of 5,000 or greater.
<6> The method according to any one of <1> to <5>, wherein the basic organic metal catalyst contains a Grignard compound, alcoholate, or an organic lithium compound, or any combination thereof, and the cocatalyst contains an acyl lactam compound.
<7> The method according to any one of <1> to <6>, wherein the ring-opening polymerization of the ring-opening polymerizable monomer containing an amide bond is performed at temperature in the range of 100° C. to 200° C.

REFERENCE SIGNS LIST 1, 3, 5, 7, 11: tank
2, 4: metering feeder
6, 8, 12, 14: metering pump
9: blending device
9a: inlet (one example of compressive fluid inlet)
9b: inlet (one example of monomer inlet)
10: feeding pump
13: reaction vessel
13a: inlet
13b: inlet (one example of catalyst inlet)
15: extrusion cap (one example of polymer outlet)
100: polymerization reaction device
P: polymer product
21: tank
22: metering pump
23: valve
24: valve
25: addition pot
26: valve
27: pressure vessel
28: valve
30: piping
200: polymerization reaction device

The invention claimed is:

1. A method for producing a polymer, wherein the method comprises:
contacting a ring-opening polymerizable monomer comprising an amide bond with a compressive fluid to melt or dissolve the ring-opening polymerizable monomer, followed by and, thereafter,
reacting the ring-opening polymerizable monomer through ring-opening polymerization in the presence of a basic organic metal catalyst and a cocatalyst, to thereby obtain a polymer product,
wherein the compressive fluid comprises ether or hydrocarbon.

2. The method according to claim 1, wherein the compressive fluid comprises dimethyl ether.

3. The method according to claim 1, wherein a monomer and oligomer content in the polymer product is 2% by mass or smaller.

4. The method according to claim 1, wherein the polymer product has a weight average molecular weight of 5,000 or greater.

5. The method according to claim 1, wherein the basic organic metal catalyst comprises at least one selected from the group consisting of a Grignard compound, an alcoholate, an organic lithium compound, and combinations thereof, and the cocatalyst comprises an acyl lactam compound.

6. The method according to claim 1, wherein the ring-opening polymerization of the ring-opening polymerizable monomer is performed at a temperature in a range of 100° C. to 200° C.

7. The method according to claim 1, wherein the compressive fluid comprises at least one member selected from the group consisting of methane, ethane, propane, 2,3-dimethylbutane, ethylene, and dimethyl ether.

8. The method according to claim 1, wherein the cocatalyst comprises at least one member selected from the group consisting of N-acetylcaprolactam, adipoyl biscaprolactam, and terephthaloyl biscaprolactam.

9. The method according to claim 1, wherein the cocatalyst comprises at least one member selected from the group consisting of N-acetylcaprolactam, adipoyl biscaprolactam, and terephthaloyl biscaprolactam,
wherein the cotcatalyst is present in an amount of from 0.01 mol % to 0.2 mol %, and
wherein the basic organic metal catalyst is present in an amount of from 0.05 mol % to 5 mol %.

10. The method according to claim 1, wherein the ring-opening polymerizable monomer comprising an amide bond comprises at least one member selected from the group consisting of ϵ-caprolactam, α-pyrrolidone, α-piperidone, enantholactam, capryllactam, and laurolactam.

11. A method for producing a polymer, wherein the method comprises:
contacting a ring-opening polymerizable monomer comprising an amide bond with a compressive fluid to melt or dissolve the ring-opening polymerizable monomer, and, thereafter,
reacting the ring-opening polymerizable monomer through ring-opening polymerization in the presence of a basic organic metal catalyst and a cocatalyst, to thereby obtain a polymer product,
wherein the compressive fluid comprises dimethyl ether.

* * * * *